(12) United States Patent
Nara et al.

(10) Patent No.: US 10,074,868 B2
(45) Date of Patent: Sep. 11, 2018

(54) FUEL CELL STACK

(71) Applicant: HONDA MOTOR CO., LTD., Tokyo (JP)

(72) Inventors: Yusuke Nara, Wako (JP); Tadashi Nishiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 66 days.

(21) Appl. No.: 15/451,410

(22) Filed: Mar. 7, 2017

(65) Prior Publication Data

US 2017/0263967 A1  Sep. 14, 2017

(30) Foreign Application Priority Data

Mar. 9, 2016 (JP) ................... 2016-045130

(51) Int. Cl.
*H01M 8/02*      (2016.01)
*H01M 8/2465*    (2016.01)
*H01M 8/2404*    (2016.01)
*H01M 8/04007*   (2016.01)
*H01M 8/1018*    (2016.01)

(52) U.S. Cl.
CPC ..... *H01M 8/2465* (2013.01); *H01M 8/04037* (2013.01); *H01M 8/2404* (2016.02); *H01M 2008/1095* (2013.01); *H01M 2250/20* (2013.01); *Y02T 90/32* (2013.01)

(58) Field of Classification Search
CPC ............. H01M 8/2465; H01M 8/2404; H01M 8/04037; H01M 2250/20; H01M 2008/1095; Y02T 90/32
See application file for complete search history.

(56) References Cited

U.S. PATENT DOCUMENTS

2015/0251560 A1* 9/2015 Ishikawa ................ B62D 21/15
                                                           180/232
2016/0344058 A1* 11/2016 Naito .................. H01M 8/2484
2017/0117570 A1* 4/2017 Ishikawa ............. B60L 11/1896

FOREIGN PATENT DOCUMENTS

JP        2005-100755       4/2005

* cited by examiner

*Primary Examiner* — Stewart A Fraser
(74) *Attorney, Agent, or Firm* — Mori & Ward, LLP

(57) ABSTRACT

A fuel cell stack includes a bracket and a boss. The bracket includes an attachment surface. The bracket includes an attachment and detachment hole and an opening hole. The boss includes a bearing surface and a locking surface part. The locking surface part is connected to the bearing surface and protrudes in an outside direction such that at least a part of the locking surface part overlaps with the attachment surface part viewed from an attachment direction when a center of the attachment and detachment hole coincides with a center of the bearing surface.

7 Claims, 12 Drawing Sheets

FUEL CELL STACK

CROSS-REFERENCE TO RELATED APPLICATIONS

The present application claims priority under 35 U. S. C. § 119 to Japanese Patent Application No. 2016-045130, filed Mar. 9, 2016. The contents of this application are incorporated herein by reference in their entirety.

BACKGROUND OF THE INVENTION

Field of the Invention

The present invention relates to a fuel cell stack.

Discussion of the Background

For example, a polymer electrolyte fuel cell includes a membrane electrode assembly (MEA), in which an anode is arranged on one side of an electrolyte membrane made of a proton exchange membrane, and a cathode is arranged on the other side thereof. The membrane electrode assembly is sandwiched by separators, and constitutes a power cell. A fuel cell normally has a predetermined number of power cells laminated therein, and is assembled into a fuel cell vehicle (e.g., fuel cell electric vehicle) as an onboard fuel cell stack, for example.

A fuel cell stack is configured by sandwiching a laminated body in which multiple power cells are laminated by a pair of end plates, and storing the laminated body inside a casing. For example, technical challenges of a fuel cell stack disclosed in Japanese Patent Application Publication No. 2005-100755 are to reduce the thickness of end plates, and to firmly and securely fasten an attachment member thereto with screws.

In Japanese Patent Application Publication No. 2005-100755, at least one of the end plates has a boss part, which protrudes from an outer surface opposite to a laminated body and has an internal thread formed therein. An attachment member such as a bracket member is fastened to the boss part with screws.

SUMMARY

According to one aspect of the present invention, a fuel cell stack including a power cell that generates power by an electrochemical reaction between fuel gas and cathode gas, a laminated body in which a plurality of the power cells are laminated being held by an outer plate member, a boss part being formed in at least one surface of the outer plate member, and a bracket member on which a fuel cell accessory is provided being attached to the one surface through a bolt screwed into a screw hole of the boss part. The bracket member includes an attachment surface part placed along the one surface. The attachment surface part has an attachment and detachment hole that allows passage of a flange part of the bolt screwed into the screw hole of the boss part, and an opening that is continuous with the attachment and detachment hole, has an opening shape narrower than the flange part and wider than a shaft diameter of the bolt, and is configured to press and hold the attachment surface part to the one surface with the bolt in an inserted state. The boss part on which the attachment surface part abuts has a smaller diameter than an opening diameter of the attachment and detachment hole. A bearing surface of the boss part has a locking surface part that, when the center of the attachment and detachment hole coincides with the center of the bearing surface in front view of the attachment surface part, protrudes to the outside of the attachment and detachment hole, while at least partially overlapping with the attachment surface part.

According to another aspect of the present invention, a fuel cell stack includes a laminated body, an outer plate, a bracket, and a boss. The laminated body includes power cells to generate electric power via an electrochemical reaction between fuel gas and cathode gas. The outer plate holds the laminated body and includes the boss on at least one surface of the outer plate. The bracket includes an attachment surface which is attached to the at least one surface with a bolt that is engaged with the boss. The bracket includes an attachment and detachment hole and an opening hole. The attachment and detachment hole passes through the bracket to the attachment surface and has a size such that a flange part of the bolt passes through the attachment and detachment hole. The opening hole passes through the bracket to the attachment surface and is connected to the attachment and detachment hole. The opening hole has a size smaller than a size of the flange part and larger than a shaft diameter of the bolt such that the bolt is inserted into the opening to bring the attachment surface into contact with the at least one surface in an attachment direction. The boss has a size smaller than the size of the attachment and detachment hole. The boss includes a bearing surface and a locking surface part. The locking surface part is connected to the bearing surface and protrudes in an outside direction substantially perpendicular to the attachment direction such that at least a part of the locking surface part overlaps with the attachment surface part viewed from the attachment direction when a center of the attachment and detachment hole coincides with a center of the bearing surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
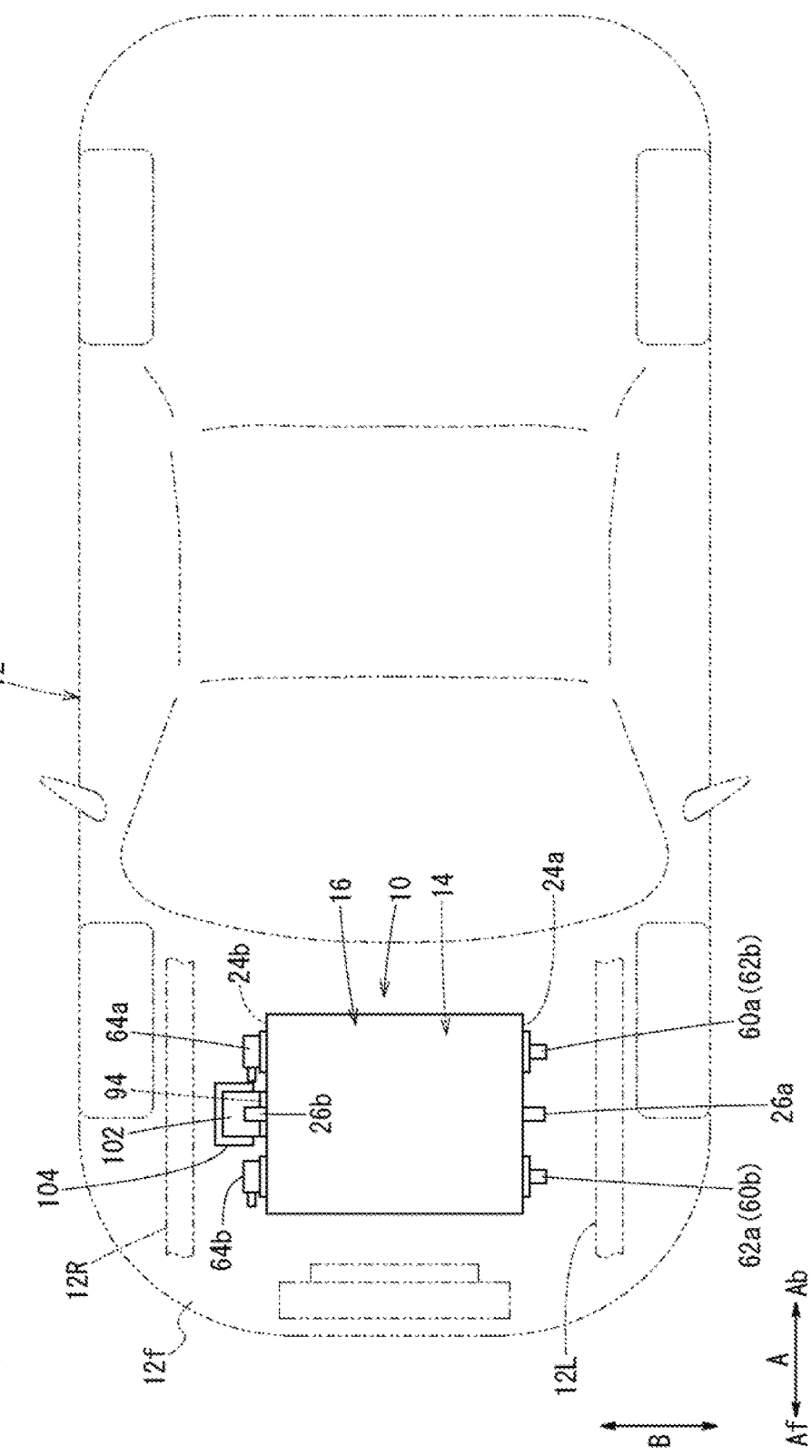
FIG. 1 is an explanatory schematic plan view of a fuel cell electric vehicle in which a fuel cell stack of an embodiment of the present invention is installed.

The embodiments will now be described with reference to the accompanying drawings, wherein like reference numerals designate corresponding or identical elements throughout the various drawings.

As shown in FIG. 1, a fuel cell stack 10 of an embodiment of the present invention is installed in a front box (so-called motor room) 12f of a fuel cell electric vehicle (fuel cell vehicle) 12, as an onboard unit.

Figure 2:
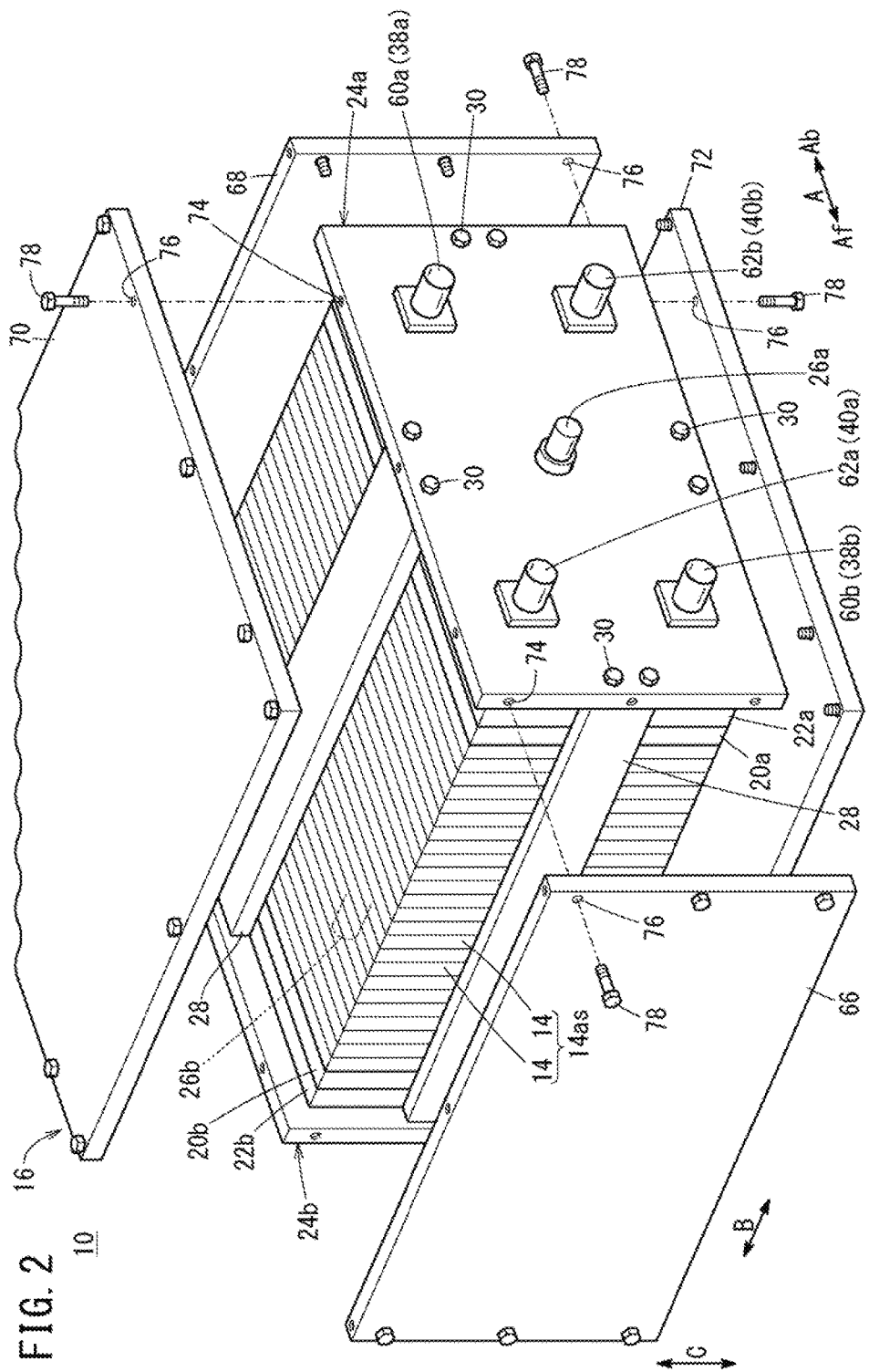
FIG. 2 is a partially exploded explanatory perspective view of a casing that accommodates the fuel cell stack.

The fuel cell stack 10 includes power cells 14, and a casing 16 that accommodates the laminated multiple power cells 14 (see FIGS. 1 and 2). Note that the casing 16 may be used when necessary, and may be omitted. As shown in FIG. 2, the power cells 14 are laminated in the vehicle width direction (arrow B direction) that intersects with the vehicle length direction (front-rear direction of the vehicle) (arrow A direction) of the fuel cell electric vehicle 12, with electrode surfaces arranged in a standing manner. Note that the power cells 14 may be laminated in the vertical direction (vehicle height direction) (arrow C direction).

As shown in FIG. 1, frame members 12R, 12L constituting a body frame extend in an arrow A direction in the front box 12f. The fuel cell stack 10 is arranged between the frame members 12R, 12L, and is mounted on an unillustrated frame member. Note that the storage place of the fuel cell stack 10 is not limited to the front box 12f, and may be under the floor of a vehicle center part, or near a rear trunk.

As shown in FIG. 2, multiple power cells 14 are laminated in an arrow B direction to constitute a laminated body 14as. A first terminal plate 20a, a first insulation plate 22a, and a first end plate 24a are arranged in this order toward the outer side, on one end of the laminated body 14as in the lamination direction. A second terminal plate 20b, a second insulation plate 22b, and a second end plate 24b are arranged in this order toward the outer side, on the other end of the laminated body 14as in the lamination direction.

A first power output terminal 26a connected to the first terminal plate 20a extends outward, from a substantial center part (or a part shifted from the center part) of the horizontally long (rectangular) first end plate 24a. A second power output terminal 26b connected to the second terminal plate 20b extends outward, from a substantial center part of the horizontally long (rectangular) second end plate 24b.

A connection bar 28 having a certain length is arranged between corresponding sides of the first end plate 24a and the second end plate 24b, at the center of each side. Both ends of the connection bar 28 are fixed to the first end plate 24a and the second end plate 24b with screws 30, and apply a clamping load on the multiple laminated power cells 14 in the lamination direction (arrow B direction).

Figure 3:
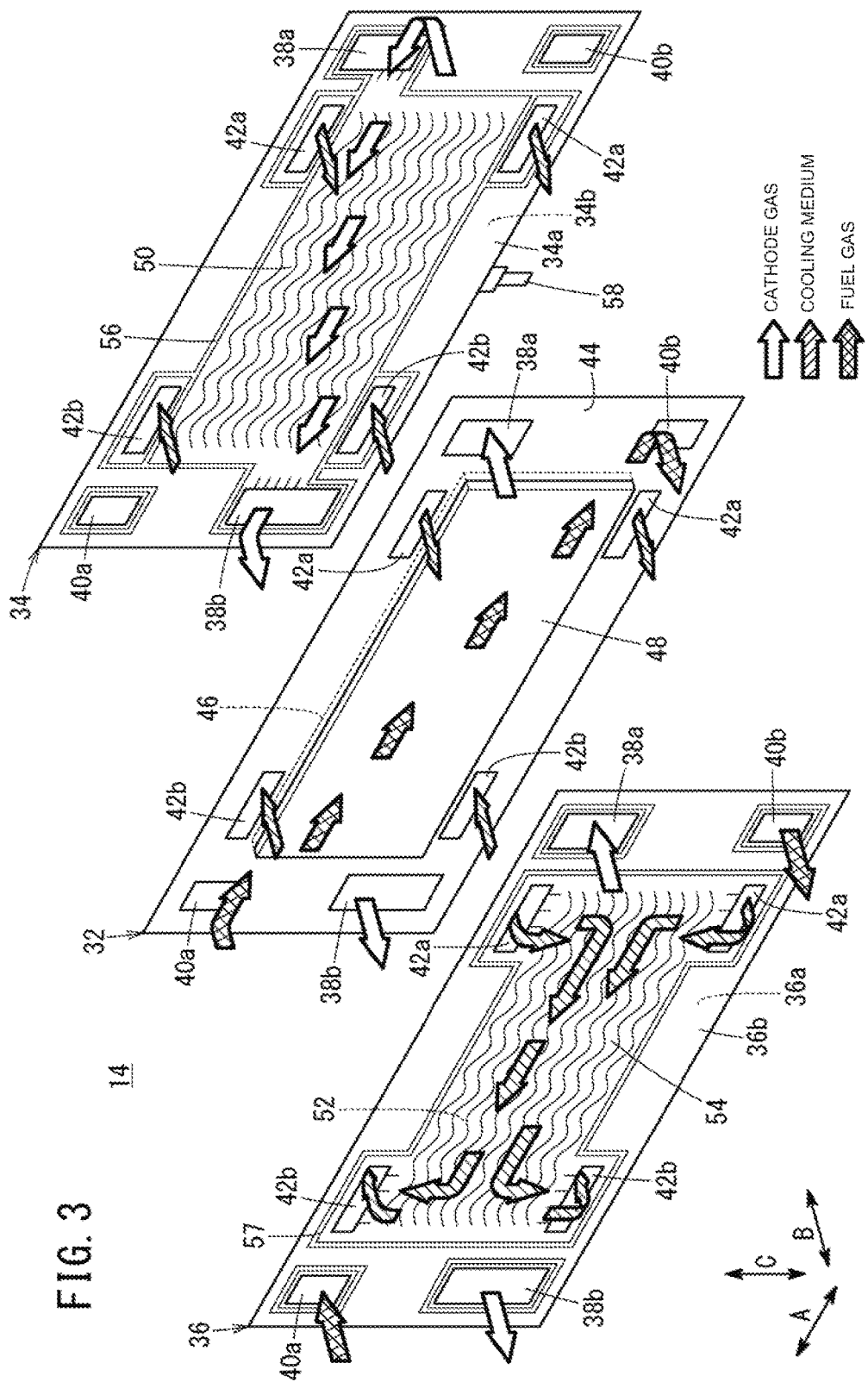
FIG. 3 is an exploded perspective view of a main part of a power cell that constitutes the fuel cell stack.

As shown in FIG. 3, the power cell 14 includes a membrane electrode assembly (MEA) 32, and a cathode separator 34 and anode separator 36 that sandwich the membrane electrode assembly 32.

The cathode separator 34 and the anode separator 36 are formed of a steel plate, a stainless steel plate, a titanium plate, an aluminum plate, a plated steel plate, or a metal plate having a metal surface subjected to anticorrosive surface treatment. The cathode separator 34 and the anode separator 36 each has a rectangular plane, and since a metal thin plate is pressed into a corrugated shape, its cross section is formed into an uneven shape. Note that the cathode separator 34 and the anode separator 36 may use carbon separators instead of the metal separators.

The cathode separator 34 and the anode separator 36 each has a horizontally long shape, where its long side extends in the horizontal direction (arrow A direction) and its short side extends in the direction of gravitational force (arrow C direction).

A cathode gas feed connection hole 38a continuous in the arrow B direction and a fuel gas exhaust connection hole 40b continuous in the arrow B direction are provided, in one end edge part of the power cell 14 in the long side direction (arrow A direction). The cathode gas feed connection hole 38a feeds cathode gas such as an oxygen-containing gas, whereas the fuel gas exhaust connection hole 40b discharges fuel gas such as a hydrogen-containing gas.

A fuel gas supply connection hole 40a continuous in the arrow B direction and configured to feed fuel gas, and a cathode gas exhaust connection hole 38b continuous in the arrow B direction and configured to discharge cathode gas are provided, in the other end edge part of the power cell 14 in the long side direction.

Two cooling medium feed connection holes 42a are provided in both end edge parts of the power cell 14 in the short side direction (arrow C direction) on one side (one end side in the horizontal direction), that is, on the side of the cathode gas feed connection hole 38a and the fuel gas exhaust connection hole 40b. The two cooling medium feed connection holes 42a are each continuous in the arrow B direction to feed a cooling medium, and are provided at the top and bottom in opposite sides.

Two cooling medium discharge connection holes 42b are provided in both end edge parts of the power cell 14 in the short side direction on the other side (other end side in the horizontal direction), that is, on the side of the fuel gas feed connection hole 40a and the cathode gas exhaust connection hole 38b. The two cooling medium discharge connection holes 42b are each continuous in the arrow B direction to discharge the cooling medium, and are provided at the top and bottom in opposite sides.

The membrane electrode assembly 32 includes a solid polymer electrolyte membrane 44, which is a thin film made of perfluorosulfonic acid containing water, for example, and a cathode 46 and anode 48 that sandwich the solid polymer electrolyte membrane 44.

The cathode 46 and the anode 48 have a gas diffusion layer (not shown) made of a carbon paper or the like, and an electrode catalyst layer (not shown) formed by uniformly applying, on the surface of the gas diffusion layer, porous carbon particles having a platinoid supported on its surface. The electrode catalyst layer is formed on both sides of the solid polymer electrolyte membrane 44.

A cathode gas passage 50 that connects the cathode gas feed connection hole 38a and the cathode gas exhaust connection hole 38b is formed, in a surface 34a of the cathode separator 34 that faces the membrane electrode assembly 32. The cathode gas passage 50 is formed of multiple wavelike passage grooves (or straight passage grooves) extending in the arrow A direction.

A fuel gas passage 52 that connects the fuel gas feed connection hole 40a and the fuel gas exhaust connection hole 40b is formed, in a surface 36a of the anode separator 36 that faces the membrane electrode assembly 32. The fuel gas passage 52 is formed of multiple wavelike passage grooves (or straight passage grooves) extending in the arrow A direction.

A cooling medium passage 54, which is continuous with the cooling medium feed connection holes 42a, 42a and the cooling medium discharge connection holes 42b, 42b, is formed between a surface 36b of the anode separator 36 and a surface 34b of the cathode separator 34. The cooling medium passage 54 extends in the horizontal direction, and circulates the cooling medium over the electrode area of the membrane electrode assembly 32.

A first seal member 56 is formed integrally with and around an outer end edge part of the cathode separator 34, on the surfaces 34a, 34b of the cathode separator 34. A second seal member 57 is formed integrally with and around an outer end edge part of the anode separator 36, on the surfaces 36a, 36b of the anode separator 36.

EPDM, NBR, fluoro rubber, silicone rubber, fluorosilicone rubber, butyl rubber, natural rubber, styrene rubber, chloroprene, acrylic, or other seal member, a cushion material, or an elastic seal member such as a gasket is used as the first seal member 56 and the second seal member 57, for example.

The cathode separator 34 has an outward protruding cell voltage terminal 58 for detecting voltage, in a center part in one of the long sides. The cell voltage terminal 58 protrudes integrally from an outer circumferential part of the long side of the metal thin plate that constitutes the cathode separator 34, for example. Although the cell voltage terminal 58 is provided in the lower side of the power cell 14, the embodiment is not limited to this, and the cell voltage terminal may be provided in the upper side of the power cell 14.

As shown in FIG. 2, a cathode gas feed manifold member 60a, a cathode gas exhaust manifold member 60b, a fuel gas feed manifold member 62a, and a fuel gas exhaust manifold member 62b are attached to the first end plate 24a. The cathode gas feed manifold member 60a and the cathode gas exhaust manifold member 60b are continuous with the cathode gas feed connection hole 38a and the cathode gas exhaust connection hole 38b. The fuel gas feed manifold member 62a and the fuel gas exhaust manifold member 62b are continuous with the fuel gas feed connection hole 40a and the fuel gas exhaust connection hole 40b.

Figure 4:
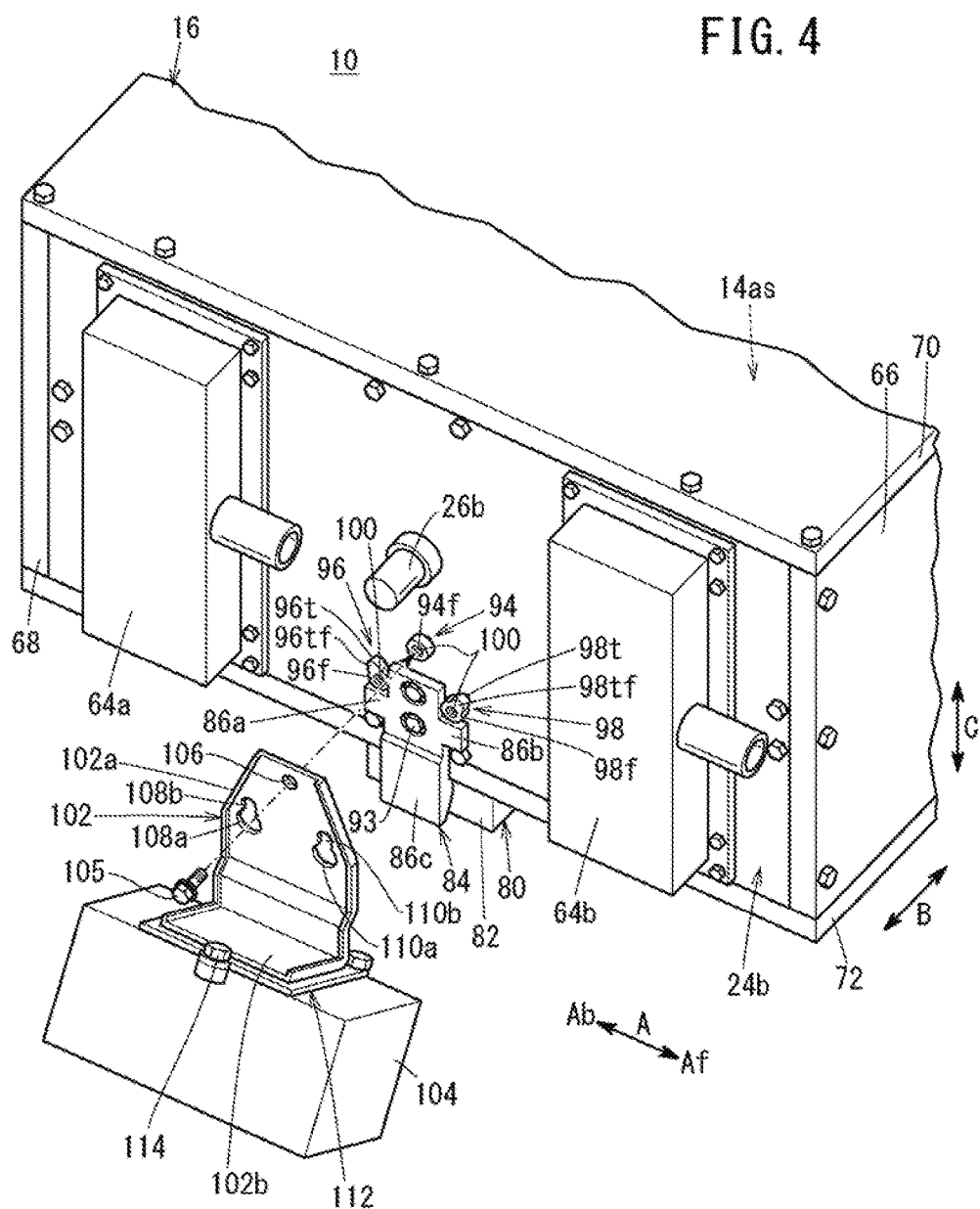
FIG. 4 is a partially exploded explanatory perspective view as viewed from a second end plate side of the fuel cell stack.

As shown in FIG. 4, a cooling medium feed manifold member 64a that is continuous with the pair of cooling medium feed connection holes 42a is attached to the second end plate 24b. A cooling medium discharge manifold member 64b that is continuous with the pair of cooling medium discharge connection holes 42b is attached to the second end plate 24b.

As shown in FIG. 2, two sides (surfaces) of the casing 16 at both ends in the vehicle width direction (arrow B direction) are configured of the first end plate 24a and the second end plate 24b, which are outer plate members. Two sides (surfaces) of the casing 16 at both ends in the vehicle length direction (arrow A direction) are configured of a horizontally long plate-shaped front side panel 66 and rear side panel 68, which are outer plate members. Two sides (surfaces) of the casing 16 at both ends in the vehicle height direction (arrow C direction) are configured of an upper side panel 70 and a lower side panel 72, which are outer plate members. The upper side panel 70 and the lower side panel 72 are each formed into a horizontally long plate shape.

Screw holes 74 are provided in side parts of the first end plate 24a and the second end plate 24b. Holes 76 corresponding to the screw holes 74 are formed in the front side panel 66, the rear side panel 68, the upper side panel 70, and the lower side panel 72. The front side panel 66, the rear side panel 68, the upper side panel 70, and the lower side panel 72 are fixed to the first end plate 24a and the second end plate 24b, by screwing screws 78 into the screw holes 74 through the holes 76.

Figure 5:
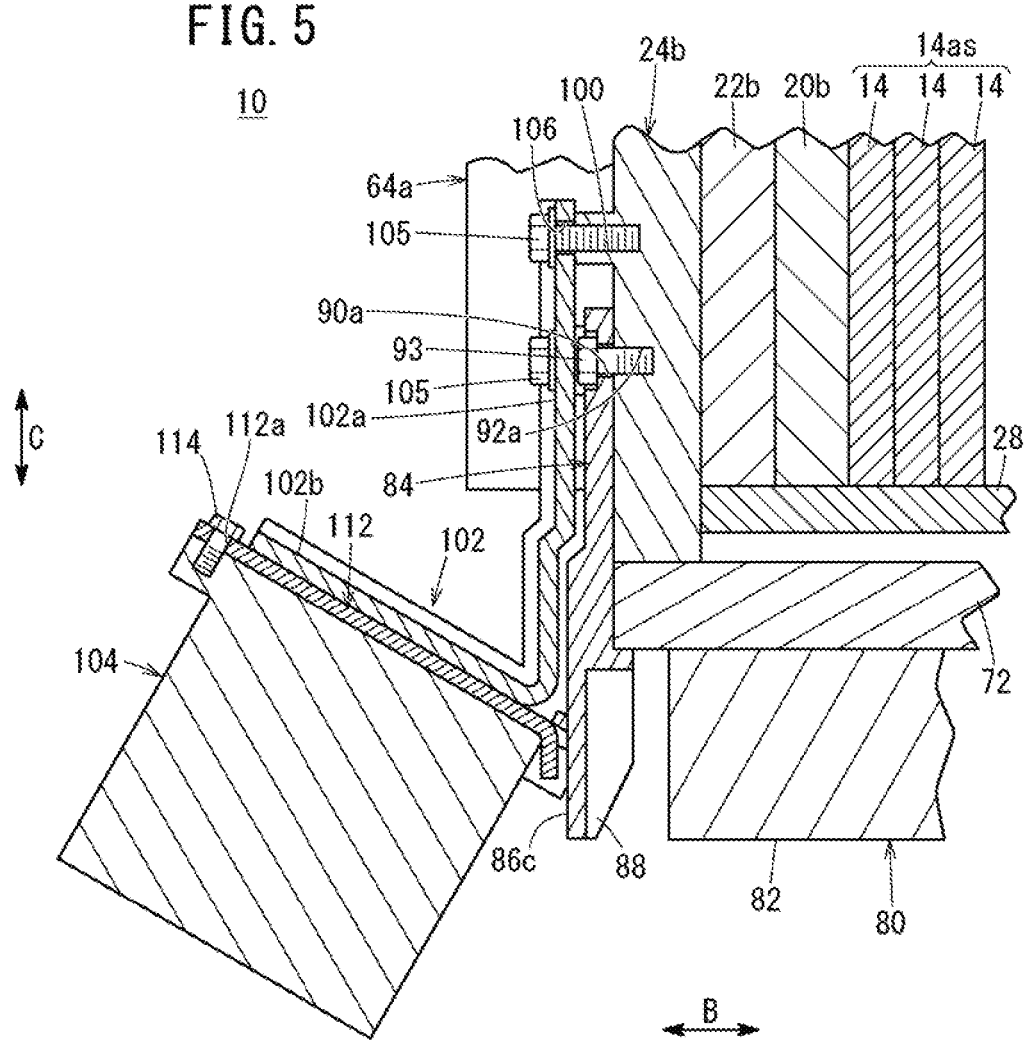
FIG. 5 is an explanatory side view showing a cross section of the fuel cell stack on the second end plate side.

As shown in FIGS. 4 and 5, the fuel cell stack 10 includes a cell voltage control unit 80 on a lower surface (or upper surface) of the laminated body 14as. The cell voltage control unit 80 has a cover 82 that is fixed to the lower side panel 72 (or the upper side panel 70). Although not shown, a harness connected to the cell voltage terminals 58, and high-voltage parts such as an ECU (electronic control unit) integrally connected with the harness are accommodated inside the cover 82.

Figure 6:
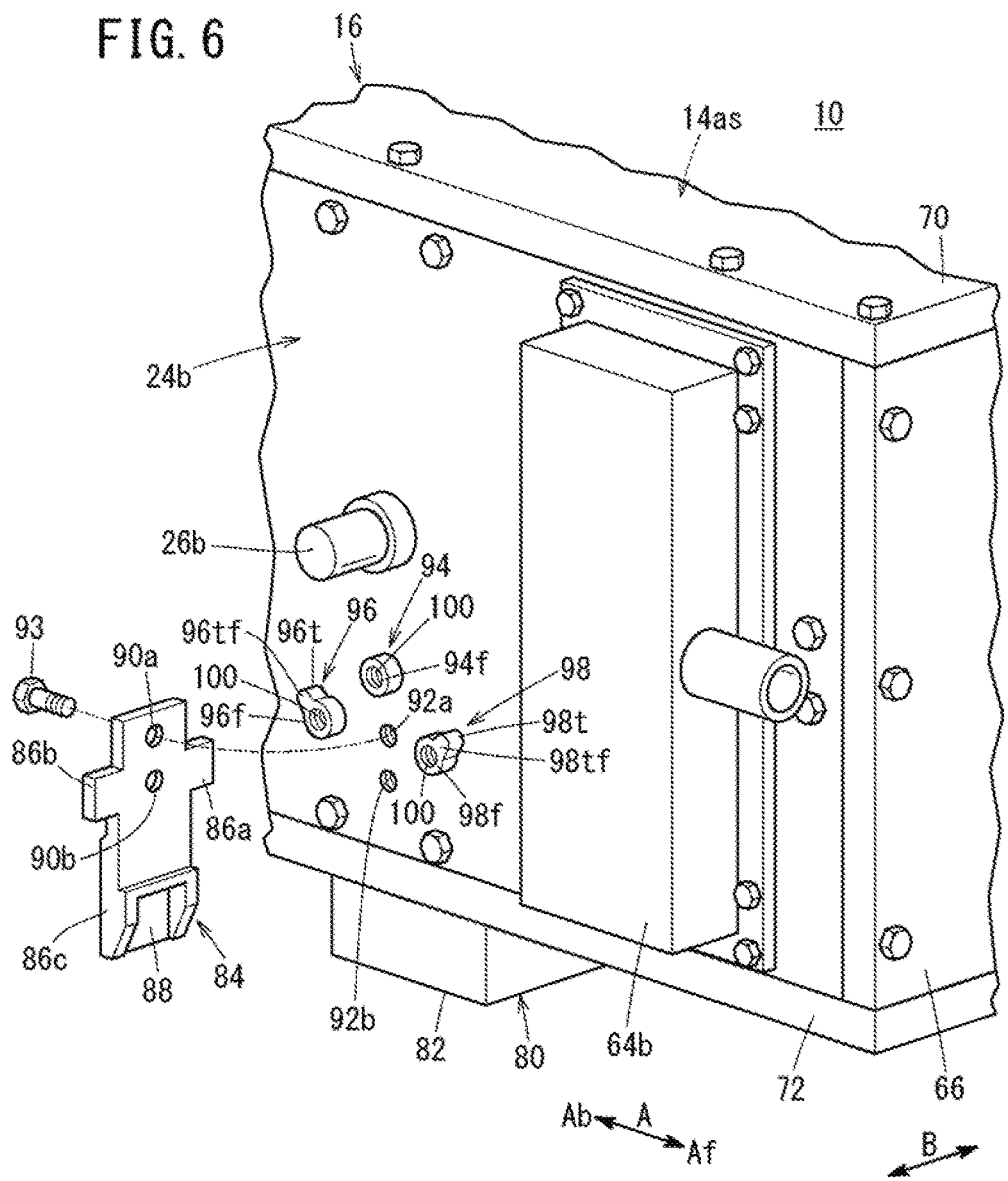
FIG. 6 is an explanatory enlarged perspective view of the fuel cell stack as viewed from the second end plate.

A protection member 84 is placed on the second end plate 24b (one end plate) where the cell voltage control unit 80 is arranged. High-strength material such as a quenched and tempered material like carbon steel and chromium molybdenum steel is used for the protection member 84. As shown in FIGS. 4 to 6, the protection member 84 has protrusions 86a, 86b protruding to both sides in the horizontal direction, and a vertically long main body part 86c.

To reduce weight, a recess 88 is provided on a surface (back surface) of the main body part 86c that faces the second end plate 24b. Upper and lower holes 90a, 90b are formed in an upper part of the protection member 84.

As shown in FIG. 6, screw holes 92a, 92b are formed in the second end plate 24b on the lower end side of a substantial center part. The protection member 84 is fixed to the second end plate 24b, by inserting screws 93 into the holes 90a, 90b of the protection member 84, and screwing the tip ends of the screws 93 into the screw holes 92a, 92b (see FIGS. 4 and 6). The main body part 86c of the protection member 84 extends in the lower direction of the second end plate 24b, and extends further than the second end plate 24b, to the front surface of the cell voltage control unit 80 (see FIGS. 4 and 5). Note that two screw holes 92b are formed if two holes 90b are provided.

Three boss parts 94, 96, and 98, for example, are provided in the vicinity of the screw hole 92a, in such a manner as to correspond to positions of vertices of a substantially triangular shape. A screw hole 100 is formed in each of the boss parts 94, 96, and 98. The boss part 94 arranged in the upper vertex of the substantially triangular shape has a columnar shape. The boss parts 96, 98 arranged in the left and right vertices of the substantially triangular shape have protrusions 96t, 98t bulging radially outward from a part of the outer circumference of the columnar shape. While the protrusions 96t, 98t may be provided in any position on the outer circumference of the boss parts 96, 98, it is preferable that they be provided in positions other than the upper end part.

Bearing surfaces 94f, 96f, and 98f that abut on a later-mentioned attachment surface part 102a are formed on the tip ends of the boss parts 94, 96, and 98. Locking surface parts 96tf, 98tf, which are provided in upper parts of the protrusions 96t, 98t, are continuous with the bearing surfaces 96f, 98f of the boss parts 96, 98.

A fuel cell accessory such as an electric heater 104, which is a high-voltage part as well, is attached to the second end plate 24b through a bracket member 102. The bracket member 102 uses a cold-rolled steel (e.g., JSC270C), for example, and is fixed to the boss parts 94, 96, and 98 through three bolts 105.

Note that not only the electric heater 104, but also various fuel cell accessories, such as a water heater, may be attached to the bracket member 102. Also, the bracket member 102 may be provided on any surface of the outer plate member constituting the fuel cell stack 10. To be specific, the bracket member 102 may be provided on at least one of the first end plate 24a, the front side panel 66, the rear side panel 68, the upper side panel 70, and the lower side panel 72.

Figure 7:
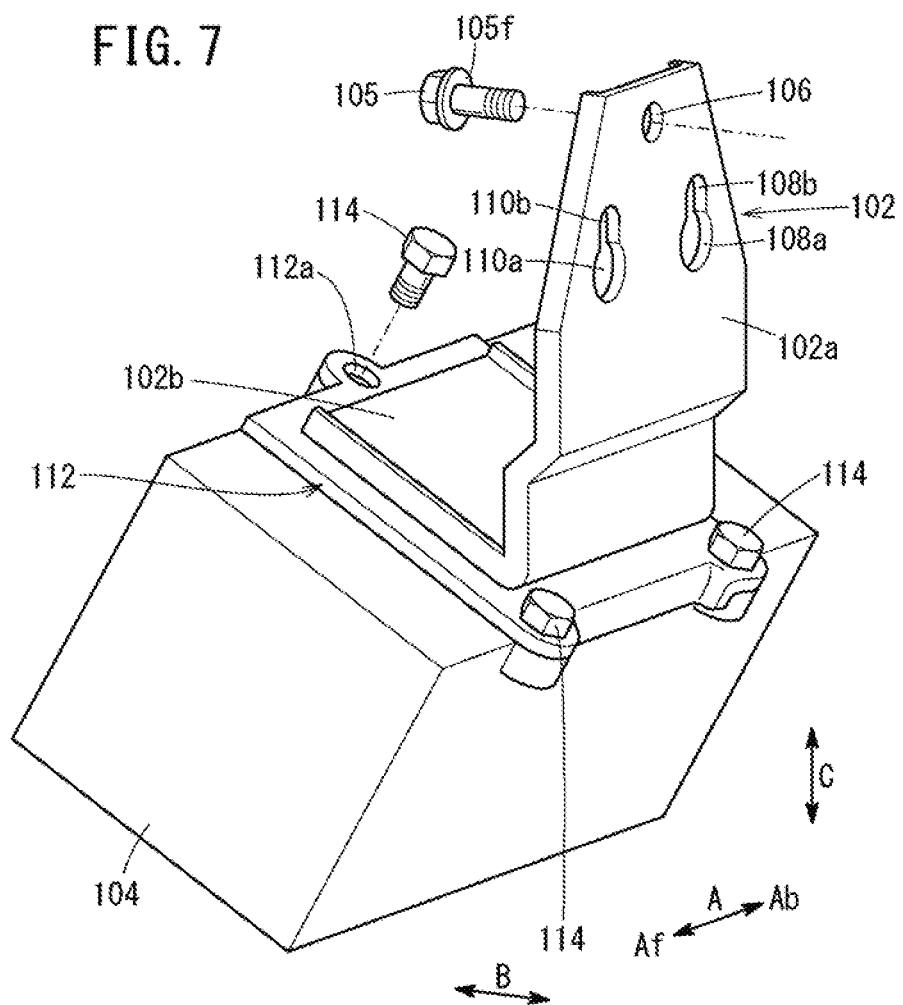
FIG. 7 is an explanatory perspective view of a bracket member constituting the fuel cell stack and an electric heater.

As shown in FIGS. 4, 5, and 7, the bracket member 102 is bent into an L shape having an acute opening angle, and has the attachment surface part 102a placed along the second end plate 24b (one surface of the outer plate member).

A hole 106 concentric with the screw hole 100 of the boss part 94 is formed in the attachment surface part 102a. The diameter of the hole 106 is set smaller than the diameter of the boss part 94, and smaller than the diameter of a flange part 105f of the bolt 105. Note that the boss part 94 may be configured in the same manner as the later-mentioned boss parts 96, 98 or may be omitted as needed. If the boss part 94 is configured in the same manner as the boss part 96, a later-mentioned attachment and detachment hole 108a and opening 108b are adopted instead of the hole 106.

The attachment surface part 102a has the attachment and detachment hole 108a, which allows passage of the flange part 105f of the bolt 105 screwed into the screw hole 100 of the boss part 96. The attachment surface part 102a has the opening 108b, which is continuous with the attachment and detachment hole 108a, and has an opening shape narrower than the flange part 105f of the bolt 105 and wider than the shaft diameter of the bolt 105. The bolt 105 presses and holds the attachment surface part 102a to the boss part 96, while being inserted into the opening 108b.

Figure 8:
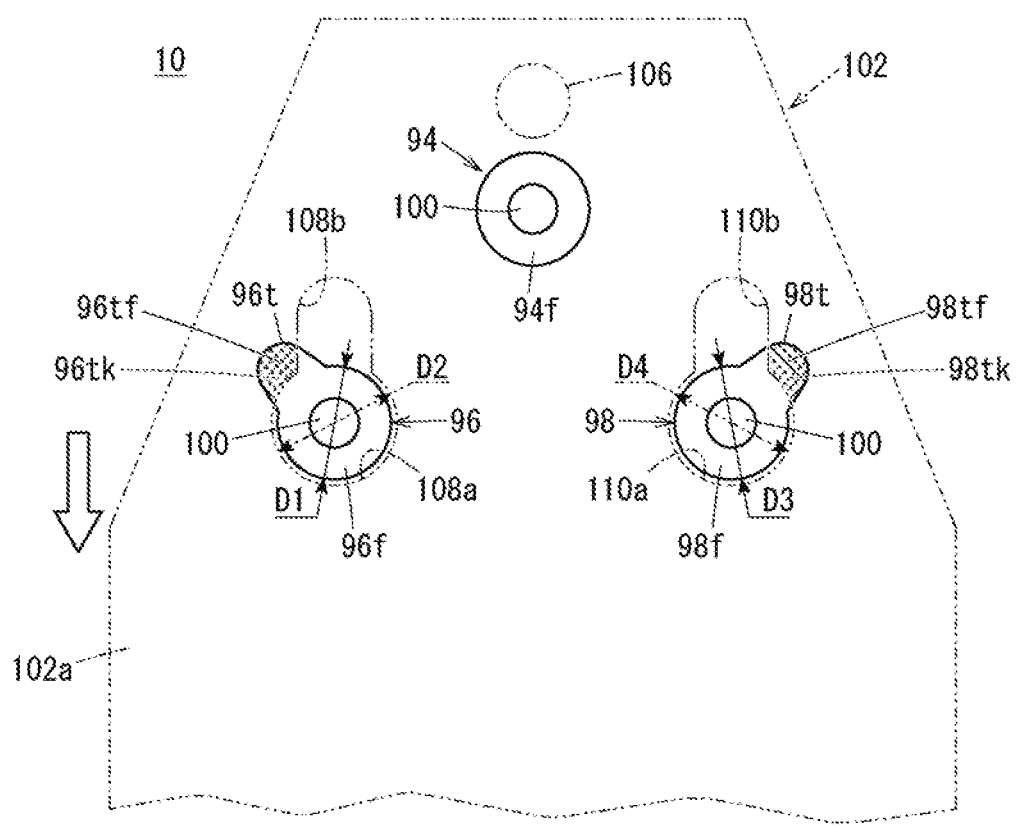
FIG. 8 is an explanatory view of when attachment and detachment hole parts of the bracket member are placed opposite to boss parts.
Figure 9:
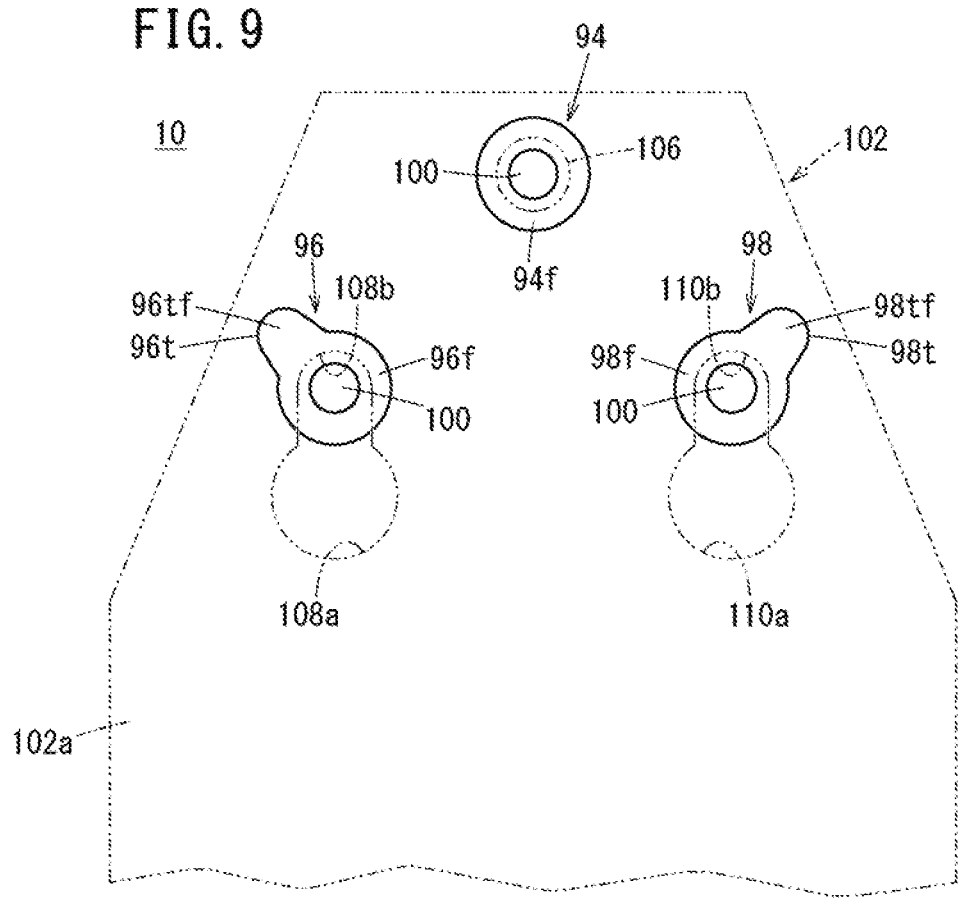
FIG. 9 is an explanatory view of when the boss parts are placed opposite to openings.

As shown in FIGS. 8 and 9, a diameter D1 of the boss part 96 is set to a value smaller than an opening diameter D2 of the attachment and detachment hole 108a (D1<D2). When the center of the attachment and detachment hole 108a coincides with the center of the bearing surface 96f in front view of the attachment surface part 102a, the locking surface part 96tf of the boss part 96 protrudes to the outside of the attachment and detachment hole 108a, while at least a part 96tk overlaps with the attachment surface part 102a.

The attachment surface part 102a has an attachment and detachment hole 110a, which allows passage of the flange part 105f of the bolt 105 screwed into the screw hole 100 of the boss part 98. The attachment surface part 102a has an opening 110b, which is continuous with the attachment and detachment hole 110a, and has an opening shape narrower than the flange part 105f of the bolt 105 and wider than the shaft diameter of the bolt 105. The bolt 105 presses and holds the attachment surface part 102a to the boss part 98, while being inserted into the opening 110b.

As shown in FIGS. 8 and 9, a diameter D3 of the boss part 98 is set to a value smaller than an opening diameter D4 of the attachment and detachment hole 110a (D3<D4). When the center of the attachment and detachment hole 110a coincides with the center of the bearing surface 98f in front view of the attachment surface part 102a, the locking surface part 98tf of the boss part 98 protrudes to the outside of the attachment and detachment hole 110a, while at least a part 98tk overlaps with the attachment surface part 102a.

As shown in FIGS. 4, 5, and 7, a flat plate 112 is fixed to the bracket member 102 by welding, for example, on a surface part 102b opposite to the attachment surface part 102a with respect to the bent part. As shown in FIG. 7, three holes 112a, for example, are formed in the flat plate 112. Screws 114 inserted into the holes 112a are screwed into the electric heater 104, whereby the electric heater 104 is fixed to the bracket member 102.

Operations of the fuel cell stack 10 configured in this manner will be described below.

First, as shown in FIG. 2, cathode gas such as an oxygen-containing gas is fed into the cathode gas feed connection hole 38a, from the cathode gas feed manifold member 60a of the first end plate 24a. Fuel gas such as a hydrogen-containing gas is fed into the fuel gas feed connection holes 40a, from the fuel gas feed manifold member 62a of the first end plate 24a.

Furthermore, as shown in FIG. 4, a cooling medium such as pure water, ethylene glycol, and oil is fed into the pair of cooling medium feed connection holes 42a, from the cooling medium feed manifold member 64a of the second end plate 24b.

Hence, as shown in FIG. 3, the cathode gas is guided into the cathode gas passage 50 of the cathode separator 34, from the cathode gas feed connection hole 38a. The cathode gas moves in the arrow A direction along the cathode gas passage 50, and is fed to the cathode 46 of the membrane electrode assembly 32.

Meanwhile, the fuel gas is supplied to the fuel gas passage 52 of the anode separator 36, from the fuel gas feed connection hole 40a. The fuel gas moves in the arrow A direction along the fuel gas passage 52, and is fed to the anode 48 of the membrane electrode assembly 32.

Accordingly, in the membrane electrode assembly 32, the cathode gas fed to the cathode 46 and the fuel gas fed to the anode 48 are consumed by an electrochemical reaction inside the electrode catalyst layer, whereby power is generated. Thus, the fuel cell electric vehicle 12 can run by electric power from the fuel cell stack 10.

Thereafter, the cathode gas fed to the cathode 46 of the membrane electrode assembly 32 and partially consumed is discharged in the arrow B direction, along the cathode gas exhaust connection hole 38b. Meanwhile, the fuel gas fed to the anode 48 of the membrane electrode assembly 32 and partially consumed is discharged in the arrow B direction, along the fuel gas exhaust connection hole 40b.

In addition, the cooling medium fed into the pair of cooling medium feed connection holes 42a is guided into the cooling medium passage 54 between the cathode separator 34 and the anode separator 36. The cooling medium first flows inward in the arrow C direction, and then moves in the arrow A direction to cool the membrane electrode assembly 32. The cooling medium moves outward in the arrow C direction, and then is discharged in the arrow B direction along the pair of cooling medium discharge connection holes 42b.

Next, a description will be given of attachment and detachment of the bracket member 102 to and from the fuel cell stack 10 for maintenance or the like.

Figure 10:
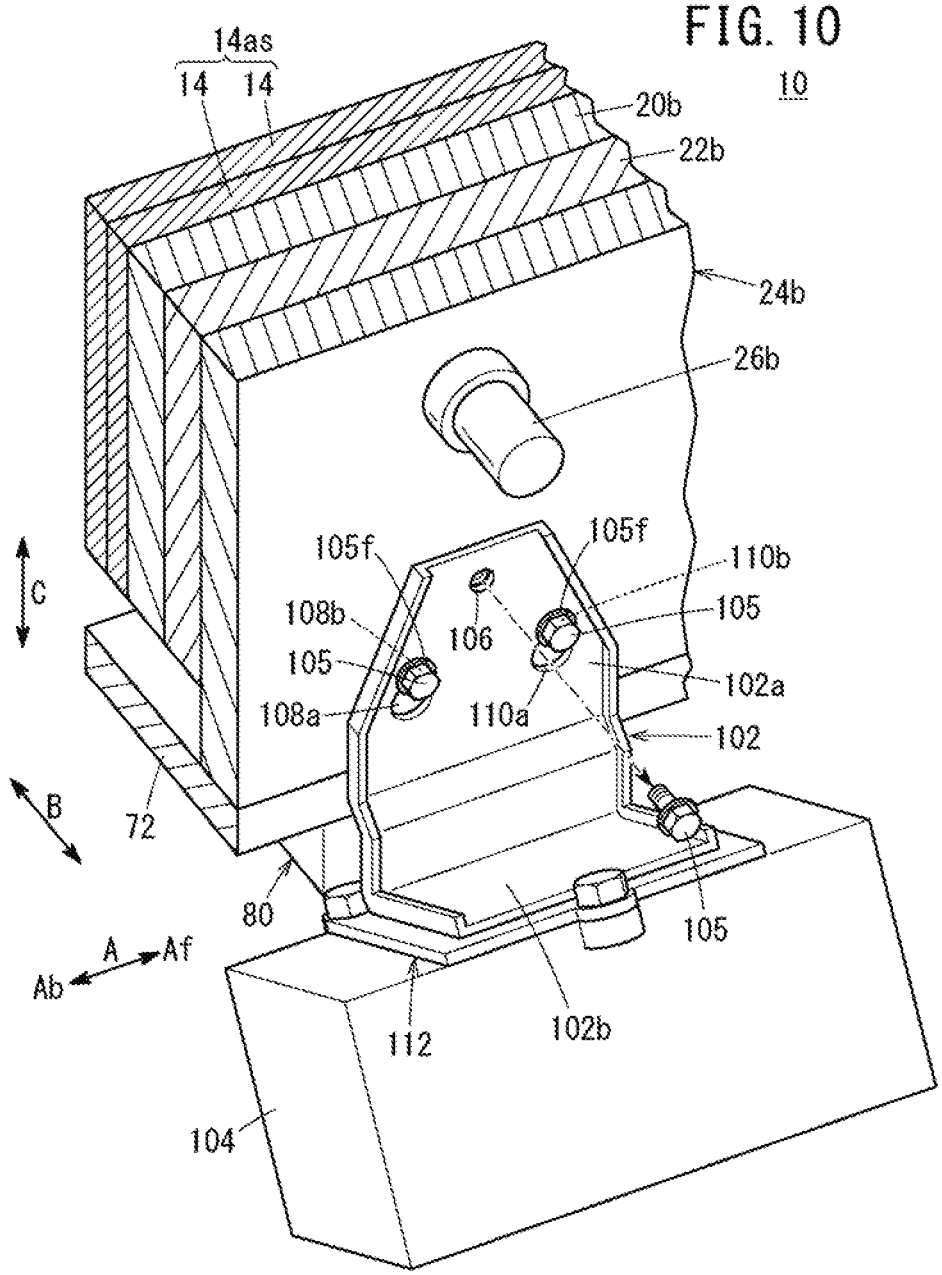
FIG. 10 is an explanatory perspective view of a state where bolts are first loosened when detaching the bracket member from the second end plate.

First, as shown in FIG. 10, the bolt 105 inserted in the hole 106 of the attachment surface part 102a is detached from the screw hole 100 of the boss part 94. Next, fixing of the attachment surface part 102a is released, by loosening the bolts 105 screwed into the screw holes 100 of the boss parts 96, 98 to a certain loosened state.

Figure 11:
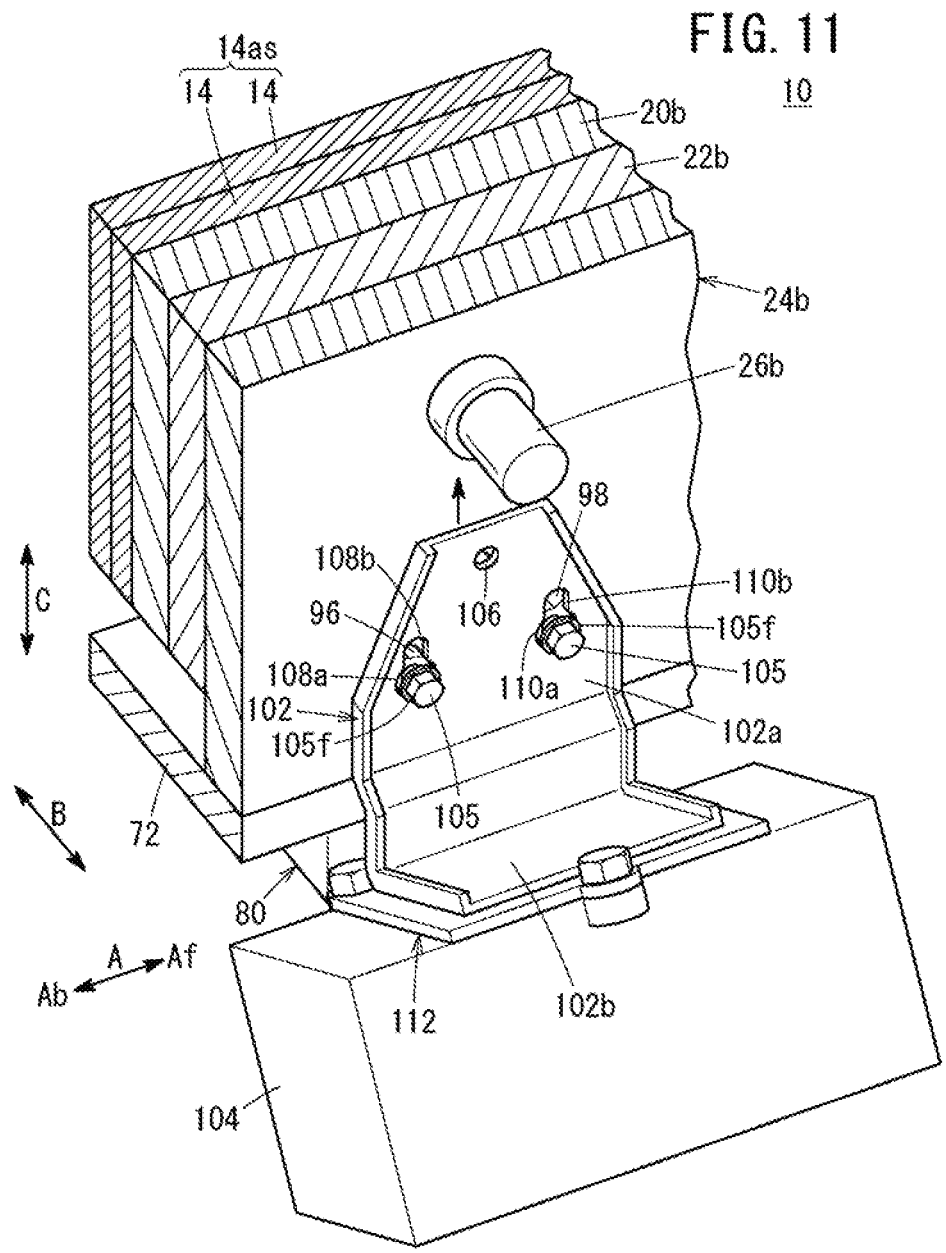
FIG. 11 is an explanatory perspective view of when the bracket member is moved upward relative to the second end plate.

Then, as shown in FIG. 11, the bracket member 102 is pushed upward together with the electric heater 104. This moves the attachment surface part 102a of the bracket member 102 upward, with the shaft part of the bolts 105 inserted in the openings 108b, 110b. Accordingly, the boss parts 96, 98 are placed in the attachment and detachment holes 108a, 110a continuous with the openings 108b, 110b.

As shown in FIG. 8, at this time, the diameter D1 of the boss part 96 is set to a value smaller than the opening diameter D2 of the attachment and detachment hole 108a, while the diameter D3 of the boss part 98 is set to a value smaller than the opening diameter D4 of the attachment and detachment hole 110a. Hence, the bracket member 102 is detached from the second end plate 24b together with the electric heater 104, as shown in FIG. 12.

Figure 12:
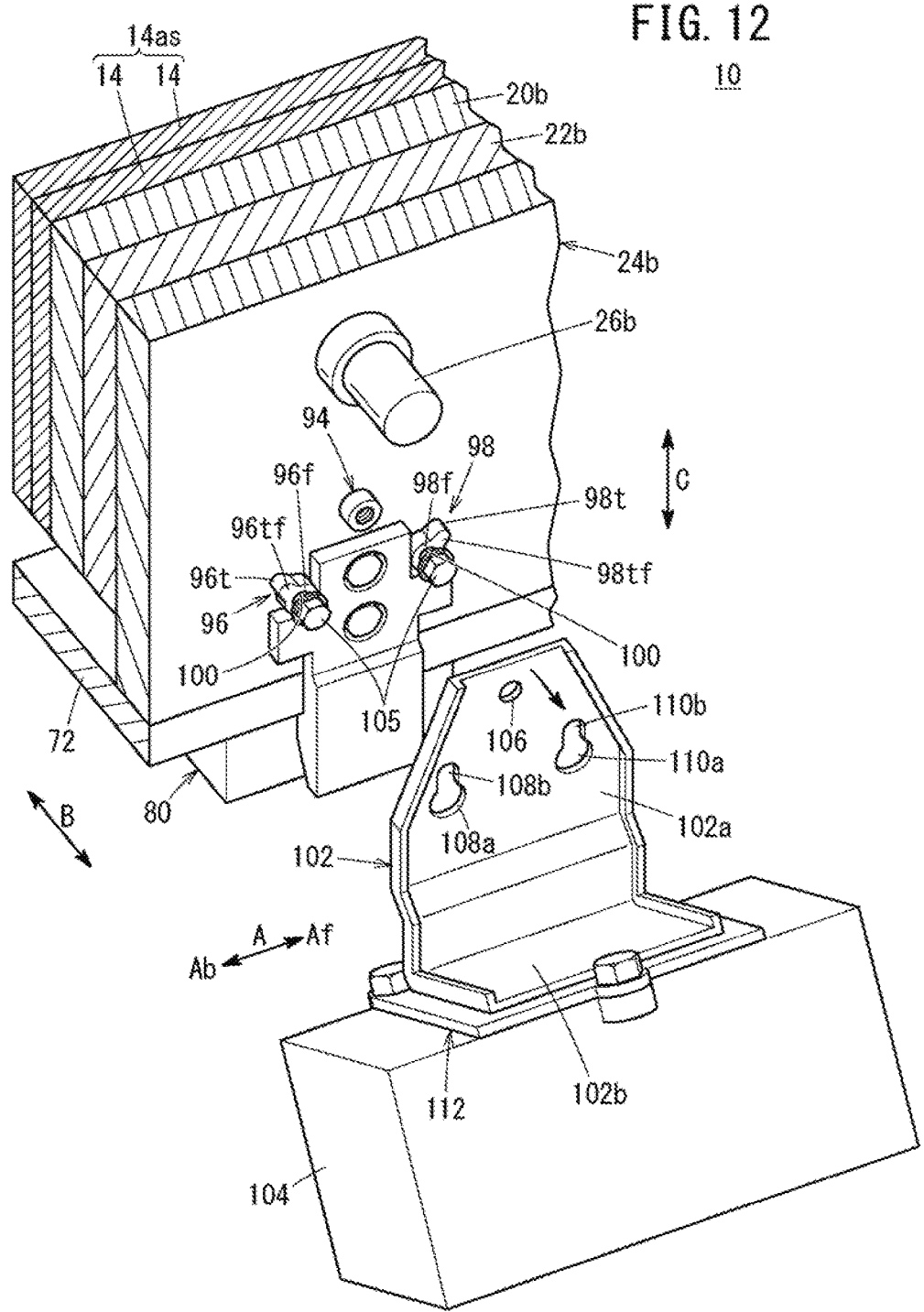
FIG. 12 is an explanatory perspective view of when the bracket member is detached from the second end plate.

On the other hand, when attaching the bracket member 102 to the second end plate 24b after completion of the maintenance, for example, as shown in FIGS. 8 and 12, the boss parts 96, 98 are placed in the centers of the attachment and detachment holes 108a, 110a of the attachment surface part 102a. When the bracket member 102 is pushed toward the second end plate 24b in this state, the bolts 105 pass through the attachment and detachment holes 108a, 110a, and the attachment surface part 102a abuts on the boss parts 94, 96, and 98.

In this case, in the embodiment, when the center of the attachment and detachment hole 108a coincides with the center of the bearing surface 96f in front view of the attachment surface part 102a, the locking surface part 96tf of the boss part 96 protrudes to the outside of the attachment and detachment hole 108a, while at least the part 96tk overlaps with the attachment surface part 102a, as shown in FIG. 8. Similarly, when the center of the attachment and detachment hole 110a coincides with the center of the bearing surface 98f in front view of the attachment surface part 102a, the locking surface part 98tf of the boss part 98 protrudes to the outside of the attachment and detachment hole 110a, while at least the part 98tk overlaps with the attachment surface part 102a.

Here, when attaching the attachment surface part 102a to the second end plate 24b, first, the flange parts 105f of the bolts 105 screwed into the boss parts 96, 98 are inserted into the attachment and detachment holes 108a, 110a, as shown in FIG. 8. At this time, the boss parts 96, 98 have the diameters D1, D3 that are smaller than the opening diameters D2, D4 of the attachment and detachment holes 108a, 110a. Moreover, the locking surface parts 96tf, 98tf protruding to the outside of the attachment and detachment holes 108a, 110a are provided in the bearing surfaces 96f, 98f of the boss parts 96, 98.

Since the attachment surface part 102a is thus held by abutting on the locking surface parts 96tf, 98tf, it is possible to surely prevent the boss parts 96, 98 from entering (dropping into) the attachment and detachment holes 108a, 110a. With this, it is possible to achieve the effects of favorably reducing the diameter particularly of the boss parts 96, 98, and enabling a simple and secure attachment and detachment of the bracket member 102.

Moreover, since the diameter of the boss parts 96, 98 can be reduced, other members can be arranged close to the boss parts 96, 98, whereby efficient use of space can be facilitated.

Note that since the procedure of attaching the bracket member 102 is the reverse of the detachment of the bracket member 102 described above, descriptions thereof will be omitted.

A fuel cell stack of the present embodiment includes a power cell that generates power by an electrochemical reaction between fuel gas and cathode gas, and holds, by an outer plate member, a laminated body in which multiple power cells are laminated. A boss part is formed in at least one surface of the outer plate member, and a bracket member on which a fuel cell accessory is provided is attached to the one surface through a bolt screwed into a screw hole of the boss part.

The bracket member includes an attachment surface part placed along the one surface. The attachment surface part has an attachment and detachment hole that allows passage of a flange part of the bolt screwed into the screw hole of the boss part. The attachment surface part has an opening that is continuous with the attachment and detachment hole, has an opening shape narrower than the flange part and wider than a shaft diameter of the bolt, and is configured to press and hold the attachment surface part to the one surface with the bolt in an inserted state.

The boss part on which the attachment surface part abuts has a smaller diameter than an opening diameter of the attachment and detachment hole. A bearing surface of the boss part has a locking surface part that, when the center of the attachment and detachment hole coincides with the center of the bearing surface in front view of the attachment surface part, protrudes to the outside of the attachment and detachment hole, while at least partially overlapping with the attachment surface part.

Also, in the fuel cell stack, the bracket member is preferably bent into an L shape. At this time, it is preferable that one side of the bent part be configured as the attachment surface part, and the other side of the bent part be configured as a holding surface part on which the fuel cell accessory is provided. It is also preferable that the attachment surface part and the holding surface part form an acute angle in side view of the bracket member.

Moreover, the fuel cell stack is preferably an onboard fuel cell stack installed in a fuel cell vehicle.

According to the present embodiment, the bearing surface of the boss part has a locking surface part that, when the center of the attachment and detachment hole coincides with the center of the bearing surface in front view of the attachment surface part, protrudes to the outside of the attachment and detachment hole, while partially overlapping with the attachment surface part. Here, when attaching the attachment surface part to the one surface, the flange part of the bolt screwed into the boss part is first inserted into the attachment and detachment hole.

At this time, the boss part has a smaller diameter than the opening diameter of the attachment and detachment hole, and the bearing surface of the boss part has the locking surface part that protrudes to the outside of the attachment and detachment hole. Since the attachment surface part is thus held by abutting on the locking surface part, it is possible to surely prevent the boss part from entering the attachment and detachment hole. With this, it is possible to favorably reduce the diameter particularly of the boss part, and enable a simple and secure attachment and detachment of the bracket member.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising a power cell that generates power by an electrochemical reaction between fuel gas and cathode gas, a laminated body in which a plurality of said power cells are laminated being held by an outer plate member, a boss part being formed in at least one surface of said outer plate member, and a bracket member on which a fuel cell accessory is provided being attached to said one surface through a bolt screwed into a screw hole of said boss part, wherein:

said bracket member includes an attachment surface part placed along said one surface;

said attachment surface part has an attachment and detachment hole that allows passage of a flange part of said bolt screwed into said screw hole of said boss part, and an opening that is continuous with said attachment and detachment hole, has an opening shape narrower than said flange part and wider than a shaft diameter of said bolt, and is configured to press and hold said attachment surface part to said one surface with said bolt in an inserted state;

said boss part on which said attachment surface part abuts has a smaller diameter than an opening diameter of said attachment and detachment hole; and a bearing surface of said boss part has a locking surface part that, when the center of said attachment and detachment hole coincides with the center of said bearing surface in front view of said attachment surface part, protrudes to the outside of said attachment and detachment hole, while at least partially overlapping with the attachment surface part.

2. The fuel cell stack according to claim 1, wherein:

said bracket member is bent into an L shape;

one side of the bent part is configured as said attachment surface part, and the other side of the bent part is configured as a holding surface part on which said fuel cell accessory is provided; and said attachment surface part and said holding surface part form an acute angle in side view of the bracket member.

3. The fuel cell stack according to claim 1, wherein said fuel cell stack is an onboard fuel cell stack installed in a fuel cell vehicle.

4. A fuel cell stack comprising:

a laminated body including power cells to generate electric power via an electrochemical reaction between fuel gas and cathode gas;

an outer plate holding the laminated body and including a boss on at least one surface of the outer plate;

a bracket including an attachment surface which is attached to the at least one surface with a bolt that is engaged with the boss, the bracket comprising:

an attachment and detachment hole passing through the bracket to the attachment surface and having a size such that a flange part of the bolt passes through the attachment and detachment hole; and an opening hole passing through the bracket to the attachment surface and connected to the attachment and detachment hole, the opening hole having a size smaller than a size of the flange part and larger than a shaft diameter of the bolt such that the bolt is inserted into the opening to bring the attachment surface into contact with the at least one surface in an attachment direction; and the boss having a size smaller than the size of the attachment and detachment hole, the boss comprising:

a bearing surface; and a locking surface part connected to the bearing surface and protruding in an outside direction substantially perpendicular to the attachment direction such that at least a part of the locking surface part overlaps with the attachment surface part viewed from the attachment direction when a center of the attachment and detachment hole coincides with a center of the bearing surface.

5. The fuel cell stack according to claim 4, wherein a fuel cell accessory is provided to the bracket.

6. The fuel cell stack according to claim 5, wherein the bracket is bent into an L shape, one side of the bent part is configured as the attachment surface, and the other side of the bent part is configured as a holding surface on which the fuel cell accessory is provided, and the attachment surface and the holding surface form an acute angle in side view of the bracket.

7. The fuel cell stack according to claim 4, wherein the fuel cell stack is an onboard fuel cell stack installed in a fuel cell vehicle.

* * * * *